United States Patent [19]
Boileau

[11] 3,799,231
[45] Mar. 26, 1974

[54] HIGH-SPEED RADIAL TIRE

[75] Inventor: Jacques Boileau, Clermont-Ferrand, France

[73] Assignee: Compagnie Generale Des Etablissments Michelin raison sociale Michelin & Cie, Clermont-Ferrand, (Pug-de-Dame), France

[22] Filed: July 10, 1972

[21] Appl. No.: 270,023

[30] Foreign Application Priority Data
July 13, 1971 France .............................. 71.25808

[52] U.S. Cl. .............................................. 152/209
[51] Int. Cl. .............................................. B60c 11/08
[58] Field of Search ..................... 152/209 R, 209 D

[56] References Cited
UNITED STATES PATENTS
3,512,566  5/1970  Verdier .............................. 152/209
D184,748  3/1959  Marick et al. .................. 152/209 D Primary Examiner—James B. Marbert
Attorney, Agent, or Firm—Brumbaugh, Graves, Donohue & Raymond

[57] ABSTRACT

A radial tire designed for high speeds has a tread comprising blocks arranged in transverse rows and formed with narrow grooves by which adjacent blocks in the same row are closely spaced apart and with transverse grooves each opening on at least one edge of the tread. The transverse grooves are relatively wide in the vicinity of such edge and relatively narrow in the vicinity of the median line of the tread.

8 Claims, 4 Drawing Figures

HIGH-SPEED RADIAL TIRE

BACKGROUND OF THE INVENTION

This invention relates to tires and, more particularly, to novel and highly-effective tires of the radial type having a tread design by which they are adapted for high-speed travel.

The cutting of the tread by grooves into protruding elements that are continuous (ribs) or discontinuous (blocks) is directed toward a compromise between contradictory requirements, namely reduced wear that is as uniform as possible, satisfactory adherence to a large variety of surfaces, dependable steering and control of the car, flexibility making it possible to absorb shocks, vibrations and noise, etc. In general, in the case of tires for passenger cars, the tread has a combination of protruding and recessed elements that are partly longitudinal and partly transverse. In particular, it is considered that circumferential grooves are indispensable to ensure good drainage of the area of contact of the tire with the ground and that circumferential ribs are necessary in order to reduce wear and increase cornering power.

Tires intended to travel at high speeds, and in particular radial tires, the crown of which is reinforced, must satisfy special requirements. Because of centrifugal force, the tread has a tendency to modify its transverse curvature. This modifies the distribution of the pressures on the ground. Similarly, when the tire rolls at high speed over a wet road, a wedge of water forms in front of the tread and produces a pressure that tends to impose a contrary curvature on the tread. Such modifications of the profile of the tread are harmful.

SUMMARY OF THE INVENTION

An object of the invention is to remedy the shortcomings of conventional tires outlined above and, in particular, to provide a tire that resists modifications of its meridian profile but permits satisfactory discharge of water present between the road and the tire. Another object of the invention is to provide a tire having improved qualities of tread wear, adherence to the road, and passenger comfort.

The foregoing and other objects of the invention are attained by the provision of a tire which in the preferred embodiment comprises a tread cut into juxtaposed blocks separated from one another by grooves or incisions. The tread is characterized in that the blocks are arranged in transverse rows, in that in each row the blocks are detached from each other exclusively by incisions or narrow grooves, and in that successive transverse rows are separated from each other by transverse grooves that open at at least one of the edges of the tread, the transverse grooves being relatively wide in the vicinity of such edge and relatively narrow near the median line of the tread.

By virtue of this construction, the tread comprises blocks that provide good support for one another in the transverse direction and also, but only in the vicinity of the median line of the tread, good longitudinal support. Because rubber is virtually incompressible, this arrangement permits the tread to resist a modification of its meridian profile on the one hand, and of its longitudinal profile in the vicinity of the median line on the other hand. The tread, as a matter of fact, does not have longitudinal grooves or cuts of appreciable width that prevent transverse blocking. Moreover, experience has shown that, contrary to all expectations, the contact area can be well drained solely by means of transverse grooves or recesses.

In one embodiment of the invention, the tread is cut transversely by relatively wide grooves extending from the edges over a width less than half of the width of the tread and connected in pairs in the central region of the tread by relatively narrow grooves or incisions. The wide and narrow grooves together cut the tread transversely over its entire width.

In another embodiment of the invention, the tread is cut transversely by grooves opening alternately at one edge of the tread and the other, the width of the grooves decreasing gradually or stepwise in the direction from the edge at which they open towards the other edge.

In both embodiments, the transverse grooves, incisions or cuts preferably have, as a whole, an undulated or zigzag path the segments of which form an angle of not more than 30° with the transverse direction. The paths of two successive grooves may be parallel or else symmetrical with respect to the transverse direction. In the latter case, the two successive grooves may combine in groups of two before opening at one edge of the tread.

The narrow incisions or grooves that make it possible in each transverse row of blocks to detach each block from the adjacent blocks preferably have a width not greater than 1 percent of the width of the tread. Their orientation is longitudinal and they form an angle not greater than 30° either in one direction or the other with the longitudinal direction.

In one embodiment, there is only a slight spacing in the longitudinal direction between successive transverse grooves or cuts: i.e., there is a relatively small longitudinal dimension to the blocks forming the transverse rows. This spacing or dimension is between one-fifth and one-tenth of the width of the tread.

The central portion of the tread, which is less cut than the lateral portions by the transverse grooves and incisions, preferably has a transverse dimension that is substantially equal to the transverse dimension of the blocks, that is to say, between one-third and one-eighth of the width of the tread.

BRIEF DESCRIPTION OF THE DRAWING

An understanding of other aspects of the invention can be gained from a consideration of the following detailed description of the preferred embodiments thereof, in conjunction with the appended figures of the drawing, wherein.

DESCRIPTION OF THE PREFERRED EMBODIMENTS

FIGS. 1 to 4 show a tire comprising a tread 1, a carcass 2 formed of radially arranged cables or cords, and a tread reinforcement 3 formed by the superimposition of two plies 4 and 5 of metal cables.

Figure 2:
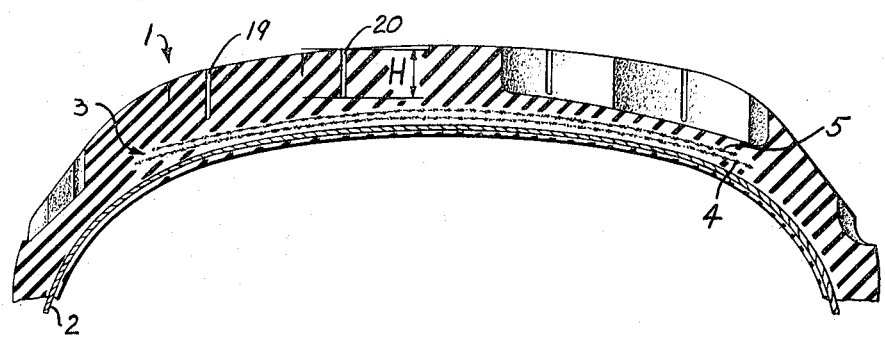
FIG. 2 is a radial section through the crown of the same tire along the section line 2—2 of FIG. 1, looking in the direction of the arrows.
Figure 1:
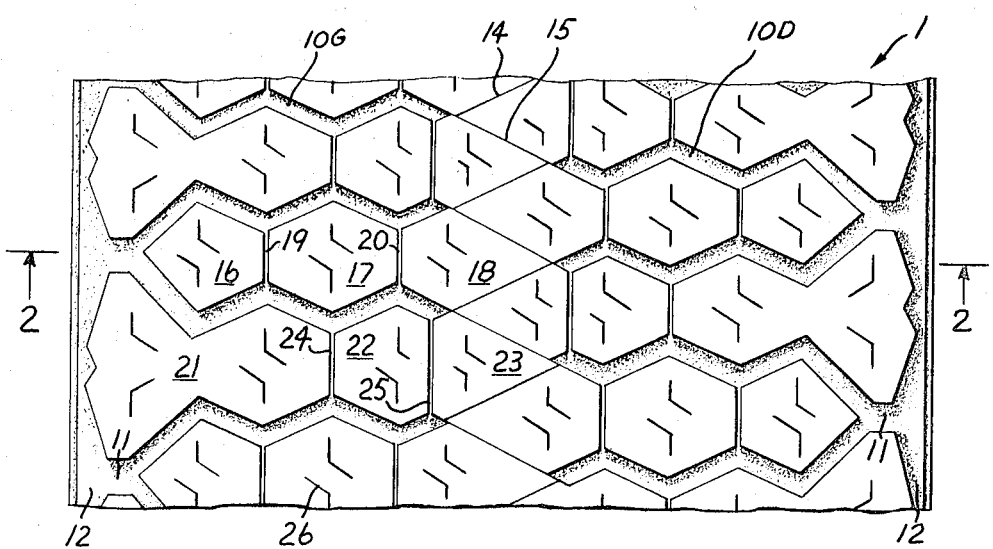
FIG. 1 is a plan view of a sector of about 13° of a tread of a tire of size 165-380 in accordance with the invention.
Figure 4:
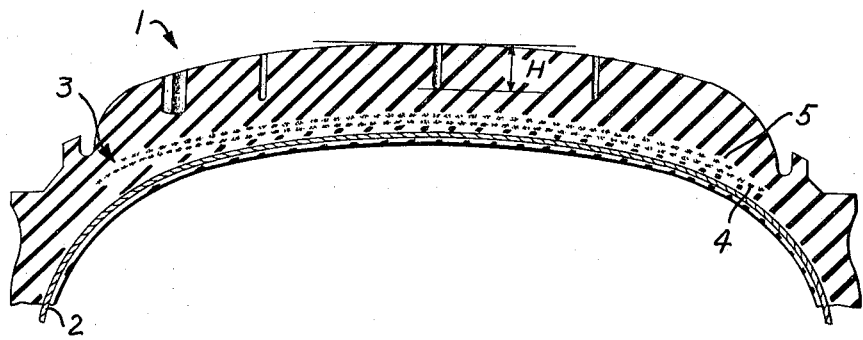
FIG. 4 is a radial section through the crown of the tire of FIG. 3 along the line 4—4 of FIG. 3, looking in the direction of the arrows.

FIG. 1 shows the design of the tread in a first embodiment of the invention. The tread 1 is cut primarily by transverse grooves 10D on the right side and 10G on the left side.

The grooves 10D and 10G are grouped in twos and meet in short grooves 11 that open into sidewall grooves 12. Each groove 10D (or 10G) is connected to the two closest grooves 10G (or 10D) by incisions 14 and 15. The overall path of two grooves 10D and 10G connected by an incision 14 or 15 is a zigzag path the elements of which are inclined, except for the segments adjacent the grooves 11, by an angle of 25° with respect to the transverse direction.

Between two grooves 10D (or 10G) connected to the same groove 11 there is an assembly of three blocks 16, 17, 18 that are separated from each other by two longitudinal incisions 19 and 20. The block 18 is bounded by the transverse incisions 14 and 15. The assembly of blocks 16, 17, 18 forms a transverse row. Between two grooves 10D (or 10G) that are adjacent but not connected to the same groove 11 there is also a group of three blocks 21, 22, 23 forming another transverse row divided by the two narrow grooves or incisions 24 and 25.

The blocks 16, 17, 18 on one side and 21, 22, 23 on the other side of the transverse grooves provide mutual support for one another in the transverse direction, being detached from each other only by incisions of slight width. Similarly, the blocks 18 and 23 are detached from each other only by the incisions 14 and 15.

On the other hand, the blocks 16, 17 are spaced from the blocks 21, 22 by the relatively wide grooves 10D or 10G.

In this example, the width of the grooves 10D and 10G is about 3 or 3.5 mm (this width varying periodically), and the width of the incisions 14, 15, 19, 20, 24, 25 is about 0.6 mm.

Each block is furthermore cut with slits such as 26.

All the grooves extend over the entire thickness H of the tread. The distance between consecutive grooves 10D (or 10G) corresponds approximately to one-seventh of the width of the tread. The width of the central part where the incisions 14 and 15 are located also corresponds approximately to one-seventh of the width of the tread.

Figure 3:
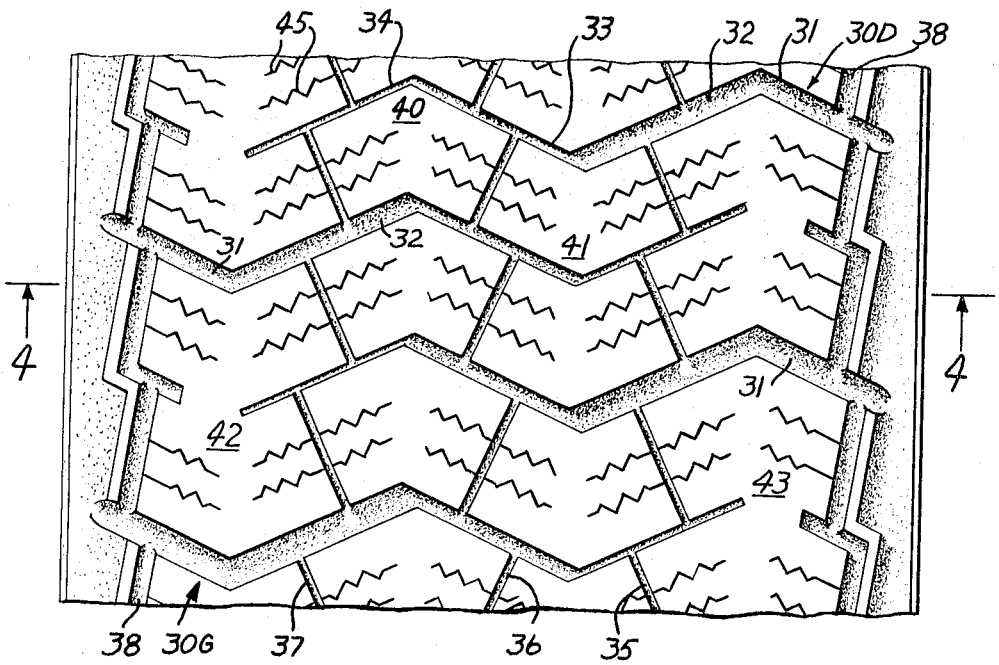
FIG. 3 is a plan view of a sector of about 17° of a tread of a tire of size 165-15 in accordance with the invention.

FIG. 3 shows the design of another tread in accordance with the invention.

Here again, transverse grooves 30D that open at the right-hand side and transverse grooves 30G that open at the left-hand side into the lateral grooves 38 form the main sculpturing.

Each groove 30D or 30G has two relatively wide lateral segments 31 and 32 and a relatively narrow central segment 33 which is extended by an incision 34.

Two adjacent grooves 30D and 30G are connected by three incisions 35, 36 and 37 perpendicular to the segments 34, 33, 32.

The space between two adjacent grooves 30D and 30G is thus divided into four blocks, namely two central blocks 40 and 41 and two lateral blocks 42 and 43. The blocks 40 to 43 provide groove transverse support for one another, being separated only by incisions 35 to 37 of slight width. Likewise, the central blocks 40 and 41, particularly in the vicinity of the incisions 36 and of the groove segments 33, support each other in the longitudinal direction better than do successive lateral blocks 42 or 43.

In this example, the grooves 3 have a width which is alternately 4.5 and 5.5 mm in the segments 31 and 32 and 2.5 and 3 mm in the central segments 33. The incisions 34, 35, 36, 37 have a width of 0.8 mm.

The blocks 40 to 43 have zigzag slits 45 in order to improve the adherence.

As in the case of the embodiment of FIG. 1, all the grooves and incisions extend over the entire thickness H of the tread. The dimension of the blocks in the longitudinal direction of the tread is of the order of one-fifth of the width of the tread. The central zone, which is less cut out, extends over approximately one-quarter of the width of the tread.

Because of the support that each block receives from the neighboring blocks, the treads of the type described have good coherence that opposes undesirable changes in profile, despite the relatively small size of each block. The result is good tracking and good wearing properties even at high speed. The numerous transverse cuts efficiently discharge water on a wet road, reducing the average distance that the water must travel during its removal. These cuts furthermore result in remarkable adherence and improved comfort, particularly by absorbing longitudinal shocks.

Thus there is provided in accordance with the invention a novel and highly-effective pneumatic tire adapted for high-speed travel. Many other embodiments within the spirit and scope of the invention will readily occur to those skilled in the art upon consideration of this disclosure. Accordingly, the invention is to be construed as including all structure that is within the scope of the appended claims.

I claim:

1. A tire comprising a tread, the tread comprising a plurality of blocks arranged in transverse rows and being formed with narrow grooves by which adjacent blocks in each row are closely spaced apart and with transverse grooves each opening at at least one edge of the tread, the transverse grooves being relatively wide in the vicinity of such edge and relatively narrow in the vicinity of the median line of the tread.

2. A tire according to claim 1 wherein the tread is cut transversely by relatively wide grooves extending from the edges of the tread over a width less than half the width of the tread and connected in pairs in the central region of the tread by relatively narrow grooves, the wide and narrow grooves together cutting the tread transversely over its entire width.

3. A tire according to claim 1 wherein the tread is cut transversely by grooves opening alternately at one edge of the tread and the other, the width of the grooves decreasing in the direction from the edge at which they open towards the other edge.

4. A tire according to claim 1 wherein the transverse grooves have a zigzag path the segments of which form an angle of not more than 30° with the transverse direction.

5. A tire according to claim 1 wherein adjacent transverse grooves are symmetrical with respect to the transverse direction and combine in groups of two before opening at the edge of the tread.

6. A tire according to claim 1 wherein the narrow grooves separating the blocks of the same row have a width not exceeding 1% of the width of the tread.

7. A tire according to claim 1 wherein the space between adjacent transverse grooves is between one-fifth and one-tenth of the width of the tread.

8. A tire according to claim 1 wherein the width of the central portion of the tread, which is cut only by narrow grooves, is between one-third and one-eighth of the width of the tread.

* * * * *

UNITED STATES PATENT OFFICE
CERTIFICATE OF CORRECTION

Patent No. 3,799,231　　　　Dated March 26, 1974

Inventor(s) Jacques Boileau

It is certified that error appears in the above-identified patent and that said Letters Patent are hereby corrected as shown below:

On the Cover Page, in the identification of the Assignee [73], "Etablissments Michelin raison" should read --Etablissements Michelin, raison--; and "(Pug-de-Dame)" should read --(Puy-de-Dome)--; in Item [57] Abstract, line 5, "on" should read --at--; Col. 3, line 66, "groove" should read --good--; and Col. 4, line 6, "3" should read --30--.

Signed and sealed this 30th day of July 1974.

(SEAL)
Attest:

McCOY M. GIBSON, JR.
Attesting Officer

C. MARSHALL DANN
Commissioner of Patents